Patented Sept. 7, 1937

2,092,164

UNITED STATES PATENT OFFICE 2,092,164

CONVERSION OF OLEFINES INTO ALCOHOLS

Walter Philip Joshua, London, Herbert Muggleton Stanley, Great Bookham, Surrey, and John Blair Dymock, Sutton, Surrey, England, assignors, by mesne assignments, to Air Reduction Company, Incorporated, New York, N. Y.

No Drawing. Application January 14, 1932, Serial No. 586,698. In Great Britain February 25, 1931

4 Claims. (Cl. 260—156)

This invention relates to the conversion of olefines into alcohols and has particular but not exclusive reference to the conversion of ethylene into ethyl alcohol by treatment with strong sulphuric acid.

The absorption of ethylene in strong sulphuric acid with production of ethyl esters and the production of ethyl alcohol therefrom is known, but according to the present invention the conversion of an olefine into its corresponding alcohol is effected directly at a temperature ranging from 140° to 200° C. and at a suitable atmospheric pressure by causing it together with steam in the vapour phase to make contact with a mass or body of material serving as carrier or surface distender to sulphuric acid of a strength ranging from about 60% acid to 85% acid. The carrier or distender may conveniently be spread along a heated tube or trough and the olefine and steam be driven through the tube or trough over the material therein.

If desired the conversion may be improved by using with the acid a suitable material known to promote and increase the absorption of ethylene in the strong acid. Silver sulphate is particularly useful as such a promoter.

The ratio of steam to olefine employed may be varied but preferably the amount of steam used is such that, acting in conjunction with the applied heat, there is sufficient steam on the one hand to take part in the chemical reaction with the olefine and on the other hand to maintain the appropriate acid concentration at the temperature specified.

Any suitable material may be used as acid carrier or surface distender such for example as broken pumice.

The following are several examples of the manner in which the invention can be carried into effect and the results obtained:—

Example I

Catalytic material was prepared consisting of pumice (as carrier) containing 60% by weight of sulphuric acid calculated on the weight of the pumice. Over 3.6 litres of this catalyst was passed a mixture of steam and ethylene in the proportion of 2 parts of ethylene to 1 part of steam at the rate of 90 litres of the mixture per hour calculated at normal temperature and pressure at a temperature of 145° C. and under 3 atmospheres absolute pressure. The conversion amounted to 1.3% and the alcohol content of the condensate was 7.65%. The residual ethylene was re-circulated over the catalyst.

Example II

Over 3.6 litres of catalyst prepared as in Example I, was passed a mixture of ethylene and steam in the proportion of 2 parts of ethylene to 1 part of steam at the rate of 180 litres of the mixture per hour calculated at normal temperature and pressure at a temperature of 170° C. and under an absolute pressure of 15 atmospheres. The amount of conversion was 1.39% and the alcohol content of the condensate was 7.15%. The residual ethylene was re-circulated over the catalyst.

The next three examples show the effect of using an absorption promoter in conjunction with the acid:—

Example III

Catalytic material was prepared consisting of pumice (as carrier) containing 60% by weight of sulphuric acid and 5% by weight of silver sulphate calculated on the weight of the pumice. Over 3.6 litres of this catalyst was passed a mixture of ethylene and steam in the proportion of 2 parts of ethylene to 1 part of steam at a rate of 87 litres of the mixture per hour calculated at normal temperature and pressure under an absolute pressure of 2 atmospheres at a temperature of 145° C. The amount of conversion was 1.4% and the percentage of alcohol in the condensate was 7.8%. The residual ethylene was re-circulated over the catalyst.

Example IV

Over the same catalyst a mixture of ethylene and steam in the same proportions as in Example III was passed a rate of 180 litres of the mixture per hour calculated at normal temperature and pressure under an absolute pressure of 9 atmospheres at a temperature of 165° C. The amount of conversion was 1.58% and the percentage of alcohol in the condensate was 8.27%. The residual ethylene was re-circulated over the catalyst.

Example V

A gas mixture as in Example III was passed at the same rate over the above catalyst under an absolute pressure of 15 atmospheres at a temperature of 170° C. The amount of conversion was 1.46% and the percentage of alcohol in the condensate was 7.56%. The residual ethylene was re-circulated over the catalyst.

We have found that the best concentration of the sulphuric acid present on the carrier lies between 60 and 70%, but can be carried as high as 85%. The concentration of the acid on the carrier depends only on the partial pressure of the steam used and the temperature of the catalyst chamber. It must be realized that with increasing partial steam pressure and a constant catalyst temperature, dilution of the catalyst will occur, but the concentration of the acid can be brought back to the desired figure by raising the reaction temperature. With set conditions of temperature and partial steam pressure the acid concentration remains constant for an indefinite period and also the catalyst activity. Therefore, the higher the partial pressure of the steam used, the higher must be the temperature of the reaction vessel. With optimum temperature and pressure conditions, increased rates of olefine circulation lead to higher hourly outputs of alcohol.

The process is not confined to the production of ethyl alcohol; for example isopropyl alcohol may be produced similarly from propylene, and higher secondary and tertiary alcohols from the corresponding olefines.

When treating the higher homologues of ethylene, such as propylene and butylene, the temperature and the concentration of the acid on the carrier must be progressively less, the greater the molecular weight of the olefine.

Finally, the invention is applicable not only to pure or substantially pure olefines but also to gas mixtures or vapours containing them.

What we claim is:—

1. The direct conversion of olefines into alcohols comprising contacting sulphuric acid of a strength ranging from above 70% to 85% extended upon an inert carrier with a mixture of the olefine and water vapor in the vapor phase at a temperature and pressure whereby the strength of said sulphuric acid may be maintained substantially constant in order to permit continuous operation.

2. The method of producing alcohols in a continuous manner which comprises passing a mixture of ethylene and steam in the proportion of two parts of ethylene to one part of steam into intimate contact with a sulphuric acid catalyst having a strength ranging from above 70% to 85% at a temperature of about 170° C. and at a pressure of about fifteen atmospheres.

3. The method of producing ethyl alcohol in a continuous manner which comprises passing a mixture of ethylene and water vapor in regulated proportions under high pressure into intimate contact with a sulphuric acid catalyst having a strength ranging from above 70% to 85% and maintained within said range and substantially uniform and at an effective temperature ranging from 160° C. to 200° C. and cooling the resulting gases to condense the alcohol therefrom.

4. The method of producing alcohols in a continuous manner which comprises passing a mixture of ethylene and steam in the proportion of two parts of ethylene to one part of steam into intimate contact with a sulphuric acid catalyst having a strength ranging from above 70% to 85% at a temperature ranging between 160° C. and 200° C. and at a pressure correlated to said temperature to maintain the strength of said sulphuric acid substantially constant in order to permit continuous operation.

WALTER PHILIP JOSHUA.
HERBERT MUGGLETON STANLEY.
JOHN BLAIR DYMOCK.